United States Patent Office 2,801,182
Patented July 30, 1957

2,801,182

SYNTHETIC RUTILE COMPOSITION

Leon Merker, New York, N. Y., assignor to National Lead Company, New York, N. Y., a corporation of New Jersey No Drawing. Application January 22, 1953,
Serial No. 332,752

4 Claims. (Cl. 106—42)

The present invention relates to rutile single crystal boule modified with respect to color and certain other physical properties.

Rutile is one of the three known crystal modifications of titanium dioxide. When substantially pure, a massive single crystal of rutile has gem-like properties with a very light straw color and reflectance, refraction and brilliance greater than that of a diamond. By means of the present invention rutile single crystals may be produced which have a blue color ranging from a bluish white to a blue black color.

The principal object of the present invention is the preparation of rutile single crystal boules having a blue color. Another object of the invention is a method for producing a rutile single crystal boule which possesses a color within the range from bluish white to blue black. These and other objects of the present invention will become apparent from the following description.

In its broadest aspects this invention contemplates a rutile single boule containing a small amount of a compound selected from the group consisting of an oxidic compound of molybdenum, an oxidic compound of tungsten and an oxidic compound of uranium in solid solution and characterized by a blue color; said boule being prepared by progressively fusing a mixture of finely divided $TiO_2$ containing a small amount of said compound in an oxy-hydrogen flame under oxidizing conditions and thereafter subjecting the boule so formed to an oxidizing treatment.

In this description of the present invention the word "boule" is used in its currently accepted meaning to denote a characteristic shape or form of an artificially prepared massive single crystal having a rounded end, or meniscus, a more or less rod-like body portion and a tapering end, giving an over-all appearance in profile of an almond, or carrot.

The general method to which the present invention relates is that described in application Serial No. 54,562, filed October 14, 1948, now abandoned, for the preparation of substantially pure rutile single crystal boules.

According to this method, there is employed as starting material a substantially pure $TiO_2$ which is very fine, fairly uniform and possesses an open structure with units capable of being rapidly melted. A $TiO_2$ having an ultimate unit particle size of approximately 0.1 micron has proved especially satisfactory. In general, material having an average particle size above about 5 microns should be avoided because such particles do not satisfactorily fuse under the conditions of the invention. A preferred method for preparing a $TiO_2$ starting material especially adapted for the production of rutile single crystal boules is described in U. S. Patent No. 2,521,392 wherein the double salt, ammonium-titanium-sulfate is calcined when all of the ammonia and sulfate has been removed by volatilization.

To prepare the rutile single crystal of the present invention a small amount of a coloring oxide is mixed with the $TiO_2$ starting material in any convenient manner for instance, by dry mixing. A more uniform mixture and therefore a preferred mixture may be prepared by adding compounds of the coloring agent as a powder, slurry or solution, to the double salt ammonium-titanium-sulfate prior to calcination. The amount of coloring agent to be added to the $TiO_2$ starting material is very small and should not exceed about 1% calculated as the metal oxide based on the weight of the $TiO_2$. The coloring agent may be an oxide itself or any oxidic compound which forms the oxide at the temperatures employed. The depth of color obtained in the reoxidized boule is dependent upon the amount of oxidic coloring agent employed. It has been found that the more coloring agent added the darker the color obtained after the reoxidization step. As previously stated the boule produced in the furnace is substantially black in color. Upon reoxidizing the boule a lighter color is obtained. It has been found that a bluish white color is obtained instead of the normally straw-white color of rutile when about 0.001% to 0.005% of the coloring agent is added to the rutile feed material. From these amounts up to about 1% of the colored oxides may be added, the larger amount, i. e. from 0.1% to 1% produces deep blue to blue black colors upon oxidation.

The rutile single crystal boule of this invention consisting of titanium dioxide and said compound may, and often will, contain small amounts of various compatible substances which may be present as impurities in the raw materials. These substances may be of a character and may be present only in amounts such that the single crystal structure of the boule and its color are not substantially affected.

In progressively fusing the starting mixture of $TiO_2$ and a compound selected from the group consisting of molybdenum oxide, tungsten oxide and uranium oxide, there should be employed a flame which carries an excess of an oxidizing gas, preferably oxygen. Preferably the fusion is carried out at a temperature of from 1830° C. to 1870° C. according to the method described in application Serial No. 54,562, supra, in which the particles of the starting mixture are entrained in a stream of oxygen in a tube constituting the center of a burner consisting of three concentric tubes. In this burner hydrogen is introduced to the flame through the intermediate tube and additional oxygen in excess over the amount required to combine with the hydrogen is introduced through the outer tube. Preferably, the ratio of oxygen to hydrogen by volume should be about 1:1 and should not be less than about 8.5 parts of oxygen to 9.5 parts hydrogen by volume.

The excess of oxygen in the flame is necessary because at elevated temperatures, titanium dioxide gives up oxygen and is converted to lower, or sub-oxides of titanium, e. g. $Ti_2O_3$. This loss of oxygen proceeds with considerable rapidity under conditions produced by an oxyhydrogen flame wherein the $TiO_2$ is fused, and the loss is accelerated when the flame is neutral or reducing. Under such conditions the formation of lower, or sub-oxides of titanium is so great that mixtures of small crystals of various oxides of titanium are produced rather than a single crystal boule. While it is preferred to use the apparatus and process described above, the crystals of the present invention may also be formed with apparatus such as that shown in Verneuil Patent No. 988,230, but it is important that at least a portion of the flame be oxidizing and that the crystal be formed in the oxidizing portion of the flame.

Even when operating with an excess of oxygen the boule as produced has a deep blue-black color indicative of some deficiency in oxygen. Therefore, in order to produce a boule of a lighter blue color, the blue-black boule has to be reoxidized.

The reoxidation of the boule is preferably carried out by heating the blue-black boule in an oxidizing atmosphere, for instance, air or oxygen. The temperature of the treatment should be within the range from about 650° C. to about 1400° C. It has been found that at temperatures to any extent below 650° C. oxygen will not be appreciably incorporated into the rutile single crystal. Preferably the oxidation should be carried out at above 1000° C. to 1300° C. The heating should be continued until the boule acquires the maximum degree of lightness of color.

As produced, a rutile boule containing the oxidic compounds of molybdenum, tungsten and uranium, has a more or less frosted outer surface. When split, the interior surfaces of the pieces are vitreous and shiny. They may be cut and polished to form beautiful gems possessing a clear blue color ranging from bluish white to blue black. In order to show the effects of the various amounts of the coloring agents upon the depth of color, the following table is presented showing the various percentage ranges which produce various depths of blue color.

|  | 0.001%–0.005% | >0.005%–0.1% | >0.1%–1% |
|---|---|---|---|
| Molybdenum Oxide<br>Tungsten Oxide<br>Uranium Oxide | bluish white | light blue to dark blue. | very dark blue to blue black. |

The boules described in the above table were prepared in the following manner. The feed material consisted of a mixture of titanium dioxide and varying quantities of the specified coloring agents. This feed material was progressively fused by a flame carrying an excess of an oxidizing gas. The fusions were carried out at temperatures between 1830° C. and 1870° C. Each boule was grown on a pedestal and to this end the feed material was passed axially down through the oxygen-hydrogen flame onto a pedestal-support aligned axially with such flame the material melted in the flame being caused to crystallize progressively by moving the pedestal-support apart axially of the flame. The blue black boule produced by the flame was then subjected to a subsequent oxidizing treatment at temperature from 1000° C. to 1300° C. to produce the desired color.

From the above description and by the examples presented, it has clearly been shown that blue rutile single crystal boules may be produced by adding small amounts of an oxidic compound of molybdenum, tungsten or uranium, or mixtures thereof, to a $TiO_2$ starting material; and that the depth of color produced by the subsequent oxidation step is dependent upon the amount of coloring agent employed.

While this invention has been described and illustrated by the examples shown, it is not intended to be strictly limited thereto and other modifications and variations may be employed within the scope of the following claims.

I claim:

1. A blue single crystal of synthetic rutile composition consisting of titania and an amount from about 0.001% to about 1% by weight of a compound selected from the group consisting of molybdenum oxide, tungsten oxide, uranium oxide and mixtures thereof.

2. A blue single crystal of synthetic rutile composition consisting of titania, and amount from about 0.001% to about 1% by weight of molybdenum oxide.

3. A blue single crystal of synthetic rutile composition consisting of titania, and amount from about 0.001% to about 1% by weight of tungsten oxide.

4. A blue single crystal of synthetic rutile composition consisting of titania, and amount from about 0.001% to about 1% by weight of uranium oxide.

References Cited in the file of this patent

UNITED STATES PATENTS

| 988,230 | Verneuil | Mar. 28, 1911 |
| 2,610,129 | Eversole et al. | Sept. 9, 1952 |
| 2,634,554 | Barnes | Apr. 14, 1953 |
| 2,693,421 | Eversole et al. | Nov. 2, 1954 |